United States Patent
Timms et al.

(10) Patent No.: US 12,529,413 B2
(45) Date of Patent: Jan. 20, 2026

(54) ACTUATORS

(71) Applicant: Goodrich Actuation Systems Limited, Wolverhampton (GB)

(72) Inventors: Jack William Timms, Wolverhampton (GB); Neil Stuart Whitfield, Shifnal (GB); Jonathan Alan Darby, Newcastle (GB)

(73) Assignee: GOODRICH ACTUATION SYSTEMS LIMITED, Wolverhampton (GB)

( * ) Notice: Subject to any disclaimer, the term of this patent is extended or adjusted under 35 U.S.C. 154(b) by 0 days.

(21) Appl. No.: 18/594,133

(22) Filed: Mar. 4, 2024

(65) Prior Publication Data
US 2024/0295256 A1    Sep. 5, 2024

(30) Foreign Application Priority Data

Mar. 2, 2023 (EP) .................... 23159799

(51) Int. Cl.
*F16H 19/08* (2006.01)
*B64C 13/28* (2006.01)
*F16H 49/00* (2006.01)

(52) U.S. Cl.
CPC ............. *F16H 19/08* (2013.01); *B64C 13/28* (2013.01); *F16H 49/001* (2013.01); *F16H 2019/085* (2013.01); *F16H 2049/003* (2013.01)

(58) Field of Classification Search
CPC ......... F16H 2049/003; F16H 2019/085; F16H 49/001; F16H 19/08; B64C 13/28
USPC .......................................................... 74/89
See application file for complete search history.

(56) References Cited

U.S. PATENT DOCUMENTS

| | | | | |
|---|---|---|---|---|
| 3,986,412 | A | * | 10/1976 | Farley .................... F16H 49/001 475/5 |
| 4,237,751 | A | * | 12/1980 | Davis .................... F16H 49/001 416/170 R |
| 6,893,371 | B2 | | 5/2005 | Mills et al. |
| 8,752,790 | B2 | | 6/2014 | Humphrey |
| 9,915,334 | B2 | | 3/2018 | Balsiger et al. |
| 12,007,009 | B2 | * | 6/2024 | Stoianovici ........... F16H 49/001 |
| 2018/0112760 | A1 | | 4/2018 | Balsiger et al. |
| 2020/0003289 | A1 | * | 1/2020 | Heise .................... F16H 49/001 |

(Continued)

FOREIGN PATENT DOCUMENTS

| | | | | |
|---|---|---|---|---|
| DE | 102005020305 A1 | * | 11/2006 | .......... F16H 49/001 |
| DE | 102020204915 A1 | | 10/2021 | |
| EP | 990819 A1 | * | 4/2000 | .......... F16H 49/001 |

OTHER PUBLICATIONS

Abstract for DE102020204915 (A1), Published: Oct. 21, 2021, 1 page.

(Continued)

*Primary Examiner* — T. Scott Fix
(74) *Attorney, Agent, or Firm* — CANTOR COLBURN LLP (57) ABSTRACT

An actuator includes an input shaft, a wave generator, a pair of flex splines, a pair of earth annuli, and an output annulus. Each of the pair of flex splines are earthed to an earth annulus. The output annulus comprises a circular spline. The wave generator is configured to be activated by rotation of the input shaft, and the wave generator is configured to elastically deform both of the pair of flex splines when the input shaft activates the wave generator.

14 Claims, 5 Drawing Sheets

(56) References Cited

U.S. PATENT DOCUMENTS

2022/0065340 A1\* 3/2022 Aras .................... F16H 49/001
2022/0173634 A1 6/2022 Gischler et al.
2022/0205497 A1 6/2022 Deng et al.

OTHER PUBLICATIONS

European Search Report for Application No. 23159799.8, mailed Aug. 8, 2023, 10 pages.

\* cited by examiner

ACTUATORS

CROSS REFERENCE TO RELATED APPLICATIONS

This application claims priority to European Patent Application No. 23159799.8 filed Mar. 2, 2023, the entire contents of which is incorporated herein by reference.

TECHNICAL FIELD

This disclosure relates to actuators, and in particular to actuators incorporating strain wave gears.

BACKGROUND

A strain wave gear, also known as a harmonic gear or harmonic drive, includes an input shaft which drives a wave generator, a flex spline and a circular spline. The wave generator is typically elliptical.

The flex spline is typically formed from an elastically deformable material, which includes x number of splines or teeth (where x is a positive whole number). The material of which the flex spline is formed is elastically deformable within the range of deformation to which it is subject in the operation of the strain wave gear. The flex spline may, for example, be a thin walled metal cup shaped element.

The circular spline is rigid and includes y number of splines or teeth. Typically numbers x and y are quite close to each other but not equal, for example in some strain wave gears y=x+2.

The flex spline, circular spline, the splines or teeth of the flex and circular splines are configured to allow a non-zero number of the flex spline teeth to engage or mesh with a non-zero number of circular spline teeth at any given time. The non-zero numbers are less than x and y respectively.

The wave generator is configured to be rotated by the input shaft, and to engage with and elastically deform the flex spline with the effect that, typically at diametrically opposite positions (relative to the axis of the input shaft), the non-zero number of splines or teeth of the flex spline in those opposite positions are pushed by the wave generator into engagement with the a non-zero number of splines or teeth on the circular spline.

SUMMARY

According to a first aspect of the present disclosure there is provided an actuator, in which the actuator comprises an input shaft, a wave generator, a pair of flex splines, a pair of earth annuli, and an output annulus. Each of the pair of flex splines are earthed to an earth annulus. The output annulus comprises a circular spline. The wave generator is configured to be activated by rotation of the input shaft, and the wave generator is configured to elastically deform both of the pair of flex splines when the input shaft activates the wave generator.

It is to be understood that the elastic deformation of the pair of flex splines by the wave generator when the input shaft activates the wave generator is either deformation of each of the pair of flex splines from an undeformed configuration, or a change in the elastic deformation of each of the pair of flex splines if those flex splines are already elastically deformed.

In some embodiments of the actuator, each of the pair of the flex splines are elastically deformed when the actuator is constructed and the activation of the wave generator causes a change in the elastic deformation of both of the pair of flex splines when the input shaft activates the wave generator.

Each earth annulus is configured to be connected to a suitable support for the actuator. A suitable support is one which is immobile relative to the actuator and against which the actuator may react when the actuator is in use. In embodiments of the actuator for use in association with control surfaces of an aircraft, the suitable support may, for example, be a spa or rib of one of the aircraft's wings or tail.

In an embodiment of the above embodiment, each earth annulus is provided with one or more apertures for use in connecting the earth annulus to the suitable support.

The earthing of a flex spline comprises fixing or connecting the flex spline directly or indirectly to one of the earth annuli in such a fashion that although at least part of the flex spline can flex when the wave generator is activated, the flex spline as a whole is retained in a fixed position relative to the wave generator and the circular spline. In particular, rotation of the wave generator does not cause the flex spline to rotate.

In an embodiment of any of the above embodiments, the earth annuli comprise at least part of a casing for the actuator. The casing at least partially defines and surrounds a void within which the flex splines and wave generator are located.

In an embodiment of any of the above embodiments, the earth annuli comprise one or more stiffening elements that contribute to the stiffness or rigidity of the actuator as a whole. Such stiffening elements may include, but not be limited to, one or more flanges across a surface of the earth annulus that increase the structural stiffness of the earth annulus as a whole.

In an embodiment of any of the above embodiments, each of the earth annuli includes an upstanding element and each upstanding element is configured to engage with a portion of a flex spline.

In an embodiment of any of the above embodiments, the upstanding element of each earth annulus is configured as a plurality of earth splines or gear teeth (collectively termed splines hereafter unless specifically stated otherwise), the flex spline comprises an equal number of earthing splines, and the earthing splines are configured to engage with the plurality of earth splines.

In an embodiment of any of the above embodiments, the input shaft has a longitudinally extending central axis about which the input shaft rotates.

Reference herein to axial, coaxial, radial and similar terminology is reference to the longitudinally extending central axis of the input shaft unless otherwise stated.

In an embodiment of any of the above embodiments, each of the pair of flex splines is cup shaped, the input shaft and each of the pair of flex splines are coaxial, and the flex splines face in opposite directions along the axis of the input shaft.

In an embodiment of any of the above embodiments, the cup shape of each of the flex splines includes a side wall that at least partially extends in a direction parallel to the axis of the input shaft between a first edge that defines an open mouth, and a second edge which is configured to directly or indirectly engage with the earth annulus. When the pair of flex splines are facing in opposite directions the open mouths defined by the flex splines are either facing towards each other or facing away from each other.

In an embodiment of any of the above embodiments, the cup shape includes a corner between a side wall that at least partially extends in a direction parallel to the axis of the input shaft between a first edge that defines an open mouth and the corner, and a cup base that extends between the corner and a second edge which is configured to directly or indirectly engage with an earth annulus.

In an embodiment of any of the above embodiments, the cup base is approximately radially extending.

In an embodiment of any of the above embodiments, the output annulus comprises one axially extending circular spline, and one or both of the flex splines engage with the circular spline.

In an embodiment of any of the above embodiments, the output annulus is configured to engage with a structural element configured to be moved by the actuator of the present disclosure. In some embodiments the structural element is a control surface of an aircraft. The structural element may, however be for use in other systems or structures where there is a need for an actuator that has one or more of characteristics: little or no backlash, compact size relative to known actuators of a similar performance, lightweight relative to known actuators of a similar performance, a high gear ratio, for example, but without limitation, in the range of 20:1 to 320:1, the actuator is reconfigurable to have different gear ratios within a standard housing, the actuator has good resolution and high levels of repeatability (linear representation) when repositioning inertial loads, the actuator has a high torque capability, and/or the actuator has coaxial input and output shafts.

In an embodiment of any of the above embodiments, the wave generator comprises a pair of wave generator elements, each wave generator element is activated by rotation of the input shaft, and one of the wave generator elements elastically deforms one of the pair of the flex splines, and the other of the wave generator elements deforms the other of the pair of the flex splines.

In an embodiment of any of the above embodiments, one of the earth annuli is engaged with one of the pair of the flex splines, and the other of the earth annuli is engaged with the other of the pair of the flex splines.

In an embodiment of any of the above embodiments, the actuator comprises pre-stage gearing, the pre-stage gearing is driven by rotation of the input shaft, and the pre-stage gearing drives the wave generator.

In an embodiment of any of the above embodiments, the actuator comprises more than one pair of flex splines, two or more earth annuli and one or more output annuli.

In an embodiment of any of the above embodiments, the actuator comprises a first non-zero number of pairs of flex splines and a second non-zero number of output annuli, and the first non-zero number equals the second non-zero number.

In an alternative embodiment of any of the above embodiments, the actuator comprises a first non-zero number of pairs of flex splines and a second non-zero number of output annuli, and the first non-zero number does not equal the second non-zero number. In some embodiments the second non-zero number is one.

In an embodiment of any of the above embodiments, the actuator comprises a second non-zero number of output annuli and a third non-zero number of earth annuli, and the third non-zero number equals the second non-zero number plus one.

In an embodiment of any of the above embodiments, at least one flex spline comprises a set of earthing splines, at least one earth annulus comprises at least one set of earth splines configured to mesh with the set of earthing splines on a flex spline, and at least one flex spline is earthed to an earth annulus via the meshing of the earthing and earth splines. In some embodiments, more than one set of earthing splines are meshed with one set of earth splines.

According to a second aspect of the present disclosure there is provided a flex spline suitable for use in an actuator according to the first aspect of the present disclosure in which the flex spline comprises a central axis, an earth portion (alternatively termed a base portion) and a flex portion (alternatively termed a side wall portion). The earth and flex portions are integral with each other and intersect at a corner portion. The earth portion extends in an at least partially radially outward direction from a first edge to the corner portion, the flex portion extends in an at least partially axial direction from the corner portion to a second edge, and the first edge of the earth portion has the form of a plurality of earth splines. The radial and axial directions are relative to the central axis of the flex spine.

In an embodiment of any of the above embodiments, when the flex spline is in an undeformed configuration (that is it is not deformed), the earth and flex portions extend in substantially linear directions, the angle between the direction in which the earth portion extends and the direction in which the flex portion extends is one of between 90 and 120 degrees, between 90 and 110 degrees, between 90 and 100 degrees, between 90 and 95 degrees, or about 90 degrees.

In an embodiment of any of the above embodiments, at least a portion of the radially outer face of the flex portion has the form of a plurality of axially orientated splines. The splines on the radially outer face of the flex portion also extend in a radially outward direction.

According to a third aspect of the preset disclosure there is provided an aircraft control surface actuation system comprising a controller and at least one actuator according to the first aspect of the present disclosure According to a fourth aspect of the preset disclosure there is provided an aircraft control surface system comprising a controller, at least one actuator according to the first aspect of the present disclosure, and a control surface.

According to a fifth aspect of the preset disclosure there is provided aircraft comprising at least one aircraft control surface system according to the first aspect of the present disclosure.

An advantage of the actuator of the present disclosure is that the use of a pair of flex splines that are orientated to face on opposite directions results in an actuator which has a balanced uniform load distribution. This minimises twisting or other damaging asymmetrical forces on the actuator.

A further advantage of the actuator of the present disclosure is that it results in a balanced wave form deflection across output spline mesh and/or reduced tooth mesh skewing between the splines of the flex splines and the circular spline or splines.

A further advantage of the actuator of the present disclosure is that it has a higher efficiency tooth mesh compared to known flex spline actuators.

A further advantage of the actuator of the present disclosure is that it has the potential for use in existing applications as an alternative driving mechanism.

A further advantage of the actuator of the present disclosure is that relative to known actuators with similar performance characteristics the actuator of the present disclosure has less weight, an improved reliability, a reduced size, fewer parts and is of lower cost.

The apparatus of the first and second aspects of the present disclosure can include one or more, or all, of the features described above, as appropriate.

BRIEF DESCRIPTION OF THE FIGURES

The present invention will be further described and explained by way of example with reference to the accompanying drawings in which.

DETAILED DESCRIPTION

In the following discussions of the accompanying drawings, where the same element is present in a more than one embodiment the same reference numeral is used for that element throughout, where there are similar elements similar reference numerals (the same numeral plus a multiple of 100) are used.

Figure 1:
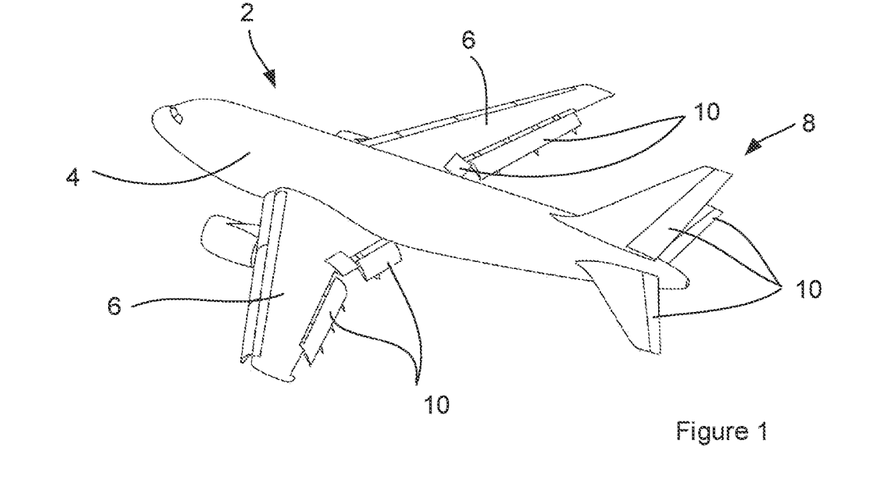
FIG. 1 shows a schematic view of an embodiment of an aircraft.

With reference to FIG. 1, an aircraft 2 has a body 4, a pair of wings 6, and a tail 8. The wings 6 and tail 8 include a non-zero number control surfaces 10 which are hingedly connected to the wings 6 or tail 8. The position of at least one or each control surface 10 relative to the wing 6 or tail 8 to which the control surface is connected is controlled by at least one actuator 12 (see FIG. 2).

With reference to FIGS. 2 to 5, the actuator 12 includes a first and second earth annulus 14, 16, an input shaft 18 and an output annulus 20. The input shaft 18 is rotated by a source of torque 100 such as, for example, a hydraulic motor or an electric motor.

Figure 2:
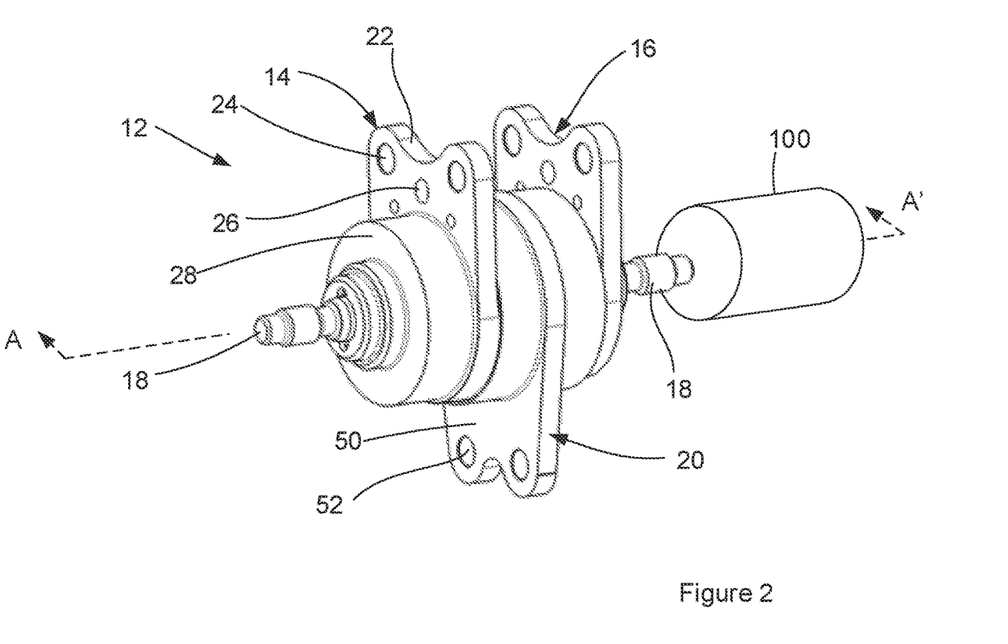
FIG. 2 shows a schematic view of a first embodiment of an actuator according to the present disclosure.
Figure 3:
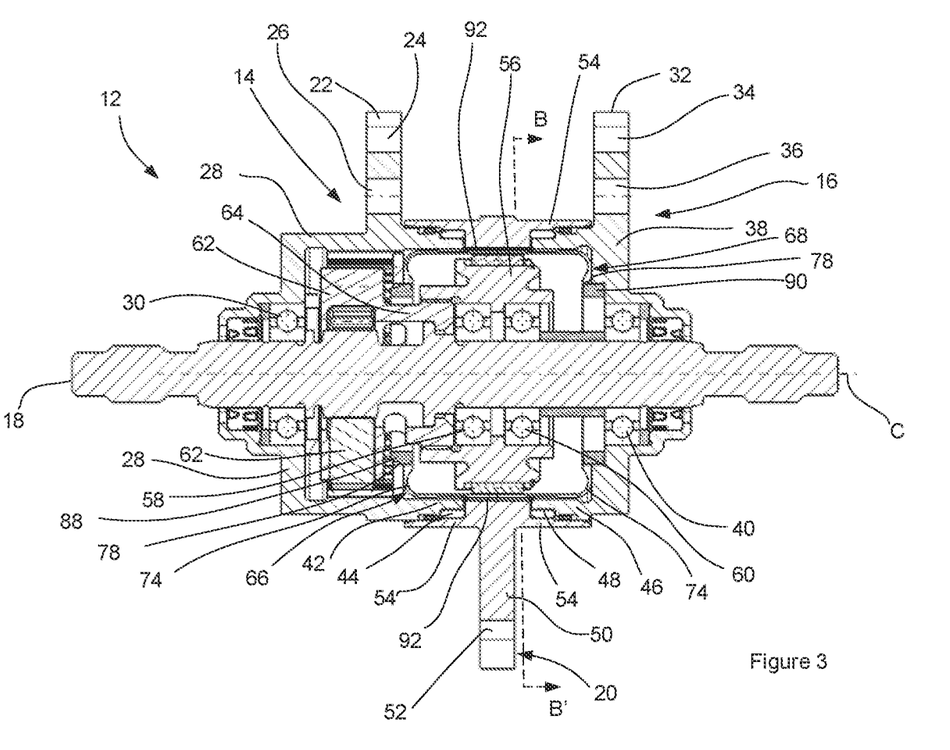
FIG. 3 shows a schematic sectional view of the actuator of FIG. 2 along the section line A-A'.

The first earth annulus 14 comprises a flange 22 adapted to be fixed to a suitable structure such as a rib or a spa (not shown) in a wing 6 or the tail 8 of the aircraft 2. A suitable structure is one which is in a fixed position relative to the wing 6 or tail 8 and which has the strength to resist the loads that the actuator 12 will exert on the structure.

The flange 22 includes a pair of mounting apertures 24 (for clarity only one mounting aperture 24 is labelled) to facilitate the attachment of the flange to the suitable structure, and a number of weight reduction apertures 26 (for clarity only one weight reduction aperture 26 is labelled). In other, non-illustrated, embodiments of the present disclosure the flange may be configured to be attached to the suitable structure using alternative attachment means.

Integral with the flange 22 is a casing 28. The casing 28 is configured to partially surround some of the moving elements of the actuator 12. The casing 28 supports a bearing 30 which is adapted to extend between the casing 28 and a part of the input shaft 18. The bearing 30 allows the input shaft 18 to rotate around its central axis C without causing the casing 28 to move.

The casing 28 includes a support portion 42 on which is supported a bearing 44. The bearing 44 extends between the support portion 42 and the casing element 54 of the output annulus 20 (described further below).

The casing 28 is also configured to form a plurality of radially outwardly extending earth splines 88. The earth splines 88 are so located that when the actuator 12 is configured for use the earth splines engage with the earthing splines 78 of a flex spline 66 (described further below).

The second earth annulus 16 comprises a flange 32 which is again adapted to be fixed to a suitable structure such as a rib or a spa (nor shown) in a wing 6 or the tail 8 of the aircraft 2. The flange 32 includes a pair of mounting apertures 34 (for clarity only one mounting aperture 34 is labelled) to facilitate the attachment of the flange 32 to the suitable structure, and a number of weight reduction apertures 36 (for clarity only one weight reduction aperture 36 is labelled).

Integral with the flange 32 is a casing 38. The casing 38 is configured to partially surround some of the moving elements of the actuator 12. The casing 38 supports a bearing 40 which is adapted to extend between the casing 38 and a part of the input shaft 18. The bearing 40 allows the input shaft 18 to rotate around its central axis C without causing the casing 38 to move.

The casing 38 includes a support portion 46 on which is supported a bearing 48. The bearing 48 extends between the support portion 46 and the casing element 54 of the output annulus 20 (described further below).

The casing 38 is configured to form a plurality of radially outwardly extending earth splines 90. The earth splines 90 are so located that when the actuator 12 is configured for use the earth splines 90 engage with the earthing splines 78 of a flex spline 68 (described further below).

The output annulus 20 comprises a flange 50 which is adapted to be fixed directly or via one or more intermediate elements (not shown) to a control surface 10 of the aircraft 2. The flange 50 includes a pair of mounting apertures 52 (for clarity only one mounting aperture 52 is labelled) to facilitate the attachment of the flange 50 to the control surface 10 or intermediate element.

Integral with the flange 50 is an axially extending cylindrical casing element 54. The casing element 54 is so configured that it at least partially overlies the support portions 42, 46 and bearings 44, 48 of the casings 28, 38 respectively. The bearings 44, 48 allow the output annulus to rotate around axis C relative to the first and second earth annuli 14, 16.

The casing element 54 includes a radially inwardly facing circular spline 92. The circular spline 92 has a number y of spline teeth. The circular spline 92 extends in an axial direction.

Within the void defined by the casings 28, 38 and casing element 54 a wave generator 56 is mounted on the input shaft 18 via bearings 58, 60. The bearings 58, 60 allow the wave generator 56 to rotate around axis C independent of or at different rotational speeds to the rotation of the input shaft 18.

Also located within the void defined by the casings 28, 38 and casing element 54 is an epicyclic gear train (also known as a planetary gear train) 62. Rotation of the input shaft 18 provides the input for the epicyclic gear train 62, and the output from the epicyclic gear train is transmitted through an output arm 64. The epicyclic gear train 62 is configured to output rotation at a reduced rotational speed and increased torque relative to the input.

The output arm 64 of the epicyclic gear train 62 is configured to engage with and drive the wave generator 56 so that it rotates around the axis C.

In other, non-illustrated embodiments the wave generator 56 is driven by alternative, non-epicyclic linkages that transmit rotary motion from the input shaft 18 to the wave generator 56.

Figure 4:
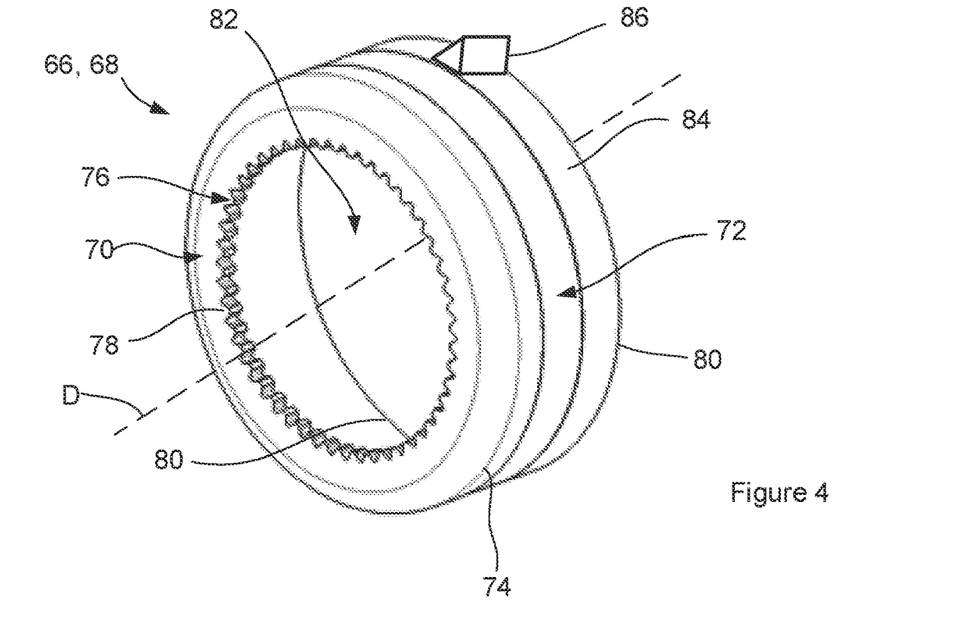
FIG. 4 shows a schematic view of an embodiment of a flex spline according to the present disclosure.

A pair of flex splines 66, 68 are mounted within the void defined by the casings 28, 38 and casing element 54. With reference to FIG. 4, each flex spline 66, 68 is formed from a thin sheet metal such as, for example, steel, and is cup shaped with an earth portion or base 70, a flex portion or side wall 72 and a corner portion or corner 74 between the base 70 and side wall 72.

The base 70 of each flex spline 66, 68 extends between a first or base edge 76 and the corner 74. The base edge 76 has the form of a plurality of earthing splines 78. The earthing splines 78 are radially inwardly extending when the actuator 12 is configured for use.

The side wall 72 of each flex spline 66, 68 extends between a second or side wall edge 80 and the corner 74. The side wall edge 80 defines a mouth 82 of the flex spline 66, 68.

Each flex spline 66, 68 has a central axis D and the side wall 72 at least partially extends in a direction parallel to the axis D. When the actuator 12 is configured for use, axis D for each flex spline 66,68 and axis C of the input shaft 18 are coaxial.

On the radially outer surface of the side wall 72, and extending from the side wall edge 80 towards the corner 74 is a splined zone 84 that includes a number x of radially outwardly facing splines 86 (for clarity only one spline 86 is illustrated). In the embodiment of the present disclosure illustrated in FIGS. 3 and 4. The relationship between the number y (the number of splines in circular spline 92) and the number x (the number of splines 86 in the splined zone 84) is that y=x+2. In other non-illustrated embodiments the relationship between the number y of splines in the circular spline and the number x of splines 86 in the splined zone may be different.

The splines 86 of each flex spline 66, 68 have a radially outer diameter that is both less than the radially inner diameter of the splines of the circular spline 92, and sufficiently close to the radially inner diameter of the splines of the circular spline 92 that the flex spline can be elastically deformed so that diametrically opposite portions 94, 96 of the spines 86 may be reversibly pushed into engagement with the splines of the portion of the circular spline 92 adjacent to those diametrically opposite portions 94, 96 when the actuator 12 is configured for use.

With reference to FIG. 3, the flex spline 66 is so located that the earthing splines 78 of flex spline 66 are engaged with the earth splines 88 of casing 28. This earths or prevents the flex spline 66 from rotating around the axes C or D. When the flex spline 66 is earthed, the splines 86 of the spline zone 84 are positioned adjacent to but not engaged with the circular spline 92 other than in the positions 94, 96 where the wave generator 56 deforms the flex spline 66 and pushes the splines 86 in positions 94, 96 into engagement with the splines of circular spline 92 at positions corresponding to positions 94, 95.

In a similar fashion, the flex spline 68 is so located that the earthing splines 78 of flex spline 68 are engaged with the earth splines 90 of casing 38. This earths or prevents the flex spline 68 from rotating around the axes C or D. When the flex spline 68 is earthed, the splines 86 of the spline zone 84 are positioned adjacent to but not engaged with the circular spline 92 other than in the positions 94, 96 where the wave generator 56 deforms the flex spline 68 and pushes the splines 86 in positions 94, 96 into engagement with the splines of circular spline 92 at positions corresponding to positions 94, 95.

The flex splines 66, 68 are so orientated in the void defined by the casings 28, 38 and casing element 54 that the mouths 82 of the flex splines 66, 68 are facing each other (that is they face in different or opposite directions) and are so distanced from each other that the splines 86 of each of the flex splines 66, 68 engage with the circular spline 92.

In other non-illustrated embodiments, the mouths 82 of the flex splines may face away from each other. In such embodiments the circular spline may be formed of two axially spaced circular splines and the wave generator may be formed from two axially spaced wave generator elements. In such embodiments each wave generator element functions in the same fashion as the illustrated wave generator but acts on only one flex spline.

Figure 5:
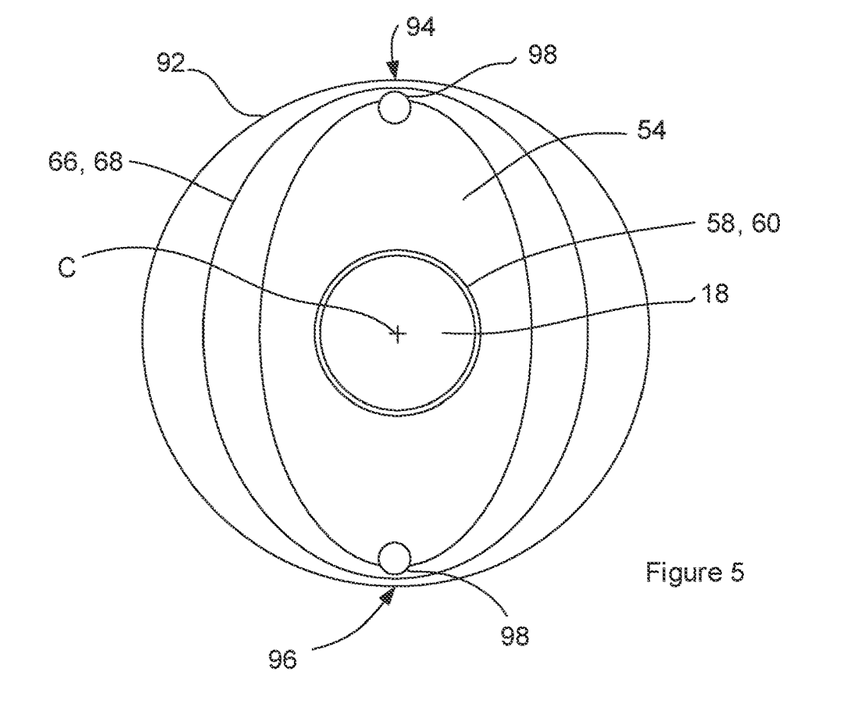
FIG. 5 shows a schematic sectional view of a section of the actuator of FIG. 2 along the section line B-B'

The interaction of the wave generator, flex splines 66, 68 and circular spline 92 may be better understood with reference to FIG. 5. In FIG. 5 the wave generator 56 is substantially elliptical in a plane perpendicular to the central axis C of the input shaft 18. The wave generator 56 includes two low friction elements 98 at the vertices of that ellipse. Those low friction elements 98 may be rollers, formed from a low friction material, or have a surface that is treated or prepared (for example by polishing) so that it has a low coefficient of friction. The low friction elements 98 are in contact with the radially inner surface of the side wall 72 of the flex splines 66, 68 at a position radially inward of the splines 86 at positions 94 and 96. The low friction elements 98 push the splines 86 in positions 94, 96 into engagement with the splines of the circular spline 92 radially adjacent to positions 94 and 96.

When the wave generator 54 is caused to rotate around the axis C by rotation of the input shaft 18 being transmitted to the wave generator via pre-stage gearing such as the epicyclic gear train 62, the positions 94, 96 move around the flex splines 66, 68 and circular spline 92 with the movement of the low friction elements 98. Because of the difference in the number of splines x on the flex splines 66, 68 and the number of splines y on the circular spline 92 the output annulus 20 will rotate around the axis C. that rotation of the output annulus 20 may cause the orientation of the control surface 10 to which the output annulus 20 is connected to change relative to the wing 6 or tail 8 of the aircraft 2.

Figure 6:
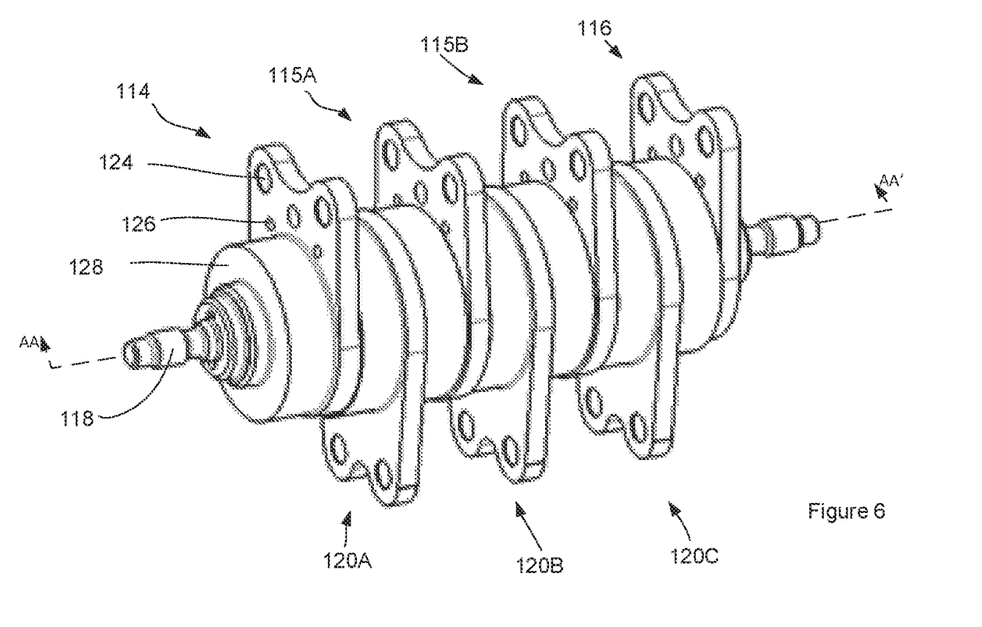
FIG. 6 shows a schematic view of a second embodiment of an actuator according to the present disclosure.
Figure 7:
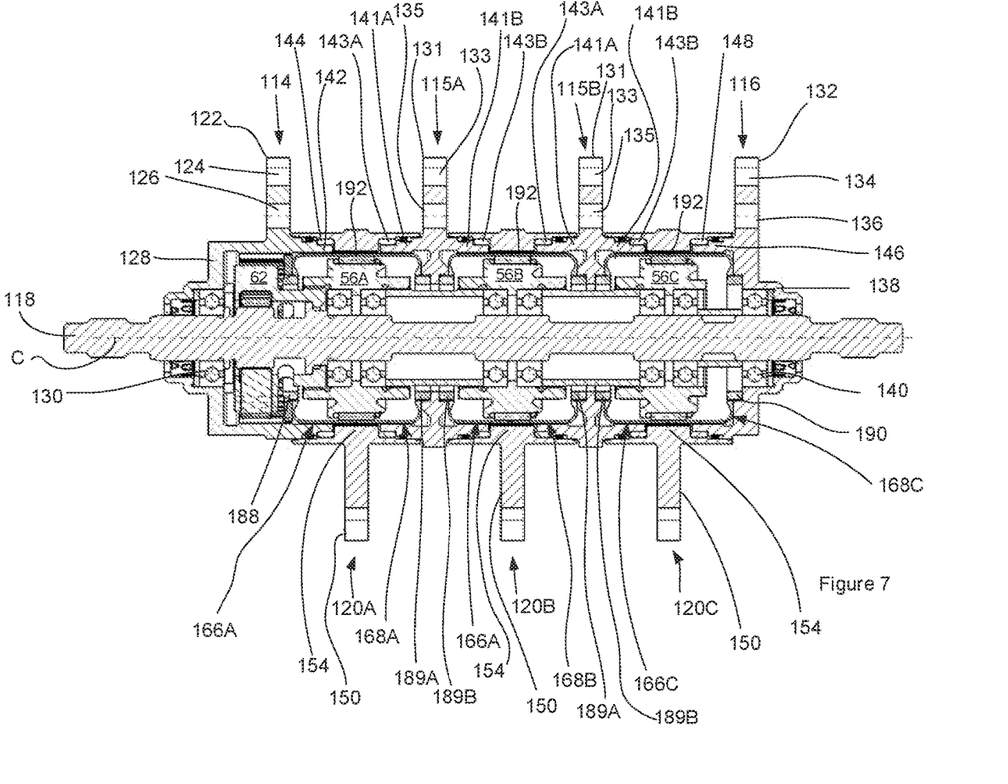
FIG. 7 shows a cross section of the actuator of FIG. 6 along the section line AA-AA'.

With reference to FIGS. 6 and 7, an actuator 112 includes first, second, third and fourth earth annuli 114, 115A, 115B, 116, an input shaft 118 and first, second, and third output annuli 120A, 120B, 120C. The input shaft 118 is rotated by a source of torque (not shown) such as, for example, a hydraulic motor or an electric motor.

The first earth annulus 114 comprises a flange 122 adapted to be fixed to a suitable structure such as a rib or a spa (nor shown) in a wing 6 or the tail 8 of the aircraft 2.

The flange 122 includes a pair of mounting apertures 124 (for clarity only one mounting aperture 124 is labelled) to facilitate the attachment of the flange 122 to the suitable structure, and a number of weight reduction apertures 126 (for clarity only one weight reduction aperture 126 is labelled).

Integral with the flange 122 is a casing 128. The casing 128 is configured to partially surround some of the moving elements of the actuator 112. The casing 128 supports a bearing 130 which is adapted to extend between the casing 128 and a part of the input shaft 118. The bearing 130 allows the input shaft 118 to rotate around its central axis C without causing the casing 128 to move.

The casing 128 includes a support portion 142 on which is supported a bearing 144. The bearing 144 extends between the support portion 142 and the casing element 154 of the first output annulus 120A (described further below).

The casing 128 is also configured to form a plurality of radially outwardly extending earth splines 188. The earth splines 188 are so located that when the actuator 112 is configured for use they engage with the earthing splines 86 of a flex spline 166A.

Each of the flex splines 166A, 166B, 166C, and 168A, 168B, 168C are the same as flex splines 66 and 68 respectively. Flex splines 66, 68 are as described above.

The second earth annulus 115A comprises a flange 131 which is again adapted to be fixed to a suitable structure such as a rib or a spa (nor shown) in a wing 6 or the tail 8 of the aircraft 2. The flange 131 includes a pair of mounting apertures 133 (for clarity only one mounting aperture 133 is labelled) to facilitate the attachment to the suitable structure, and a number of weight reduction apertures 135 (for clarity only one weight reduction aperture 135 is labelled).

The second earth annulus 115A includes a first and second support portion 141A, 141B on which are supported bearings 143A and 143B respectively. The bearing 143A extends between the support portion 141A and the casing element 154 of the first output annulus 120A (described further below). The bearing 143B extends between the support portion 141B and the casing element 154 of the second output annulus 120B (described further below).

The second earth annulus 115A is configured to form a first and second plurality of radially outwardly extending earth splines 189A, 189B. The earth splines 189A, 189B are so located that when the actuator 112 is configured for use they engage with the earthing splines 78 of flex splines 168A and 166B respectively.

The third earth annulus 115B has the same structure as the second earth annulus 115A.

The third earth annulus 115B includes a first and second support portion 141A, 141B on which are supported bearings 143A and 143B respectively. The bearing 143A extends between the support portion 141A and the casing element 154 of the second output annulus 120B (described further below). The bearing 143B extends between the support portion 141B and the casing element 154 of the third output annulus 120C (described further below).

The third earth annulus 115B is configured to form a first and second plurality of radially outwardly extending earth splines 189A, 189B. The earth splines 189A, 189B are so located that when the actuator 112 is configured for use they engage with the earthing splines 78 of flex splines 168B and 166C respectively.

The fourth earth annulus 116 comprises a flange 132 which is again adapted to be fixed to a suitable structure such as a rib or a spa (nor shown) in a wing 6 or the tail 8 of the aircraft 2. The flange 132 includes a pair of mounting apertures 134 (for clarity only one mounting aperture 134 is labelled) to facilitate the attachment of the flange 132 to the suitable structure, and a number of weight reduction apertures 136 (for clarity only one weight reduction aperture 136 is labelled).

Integral with the flange 132 is a casing 138. The casing 138 is configured to partially surround some of the moving elements of the actuator 112. The casing 138 supports a bearing 140 which is adapted to extend between the casing 138 and a part of the input shaft 118. The bearing 140 allows the input shaft 118 to rotate around its central axis C without causing the casing 138 to move.

The casing 138 includes a support portion 146 on which is supported a bearing 148. The bearing 148 extends between the support portion 146 and the casing element 154 of the output annulus 120C (described further below).

The casing 138 is configured to form a plurality of radially outwardly extending earth splines 190. The earth splines 190 are so located that when the actuator 112 is configured for use they engage with the earthing splines 78 of flex spline 168C.

Each of the output annuli 120A, 120B, 120C comprises a flange 150 which is adapted to be fixed directly or via one or more intermediate elements (not shown) to a control surface 10 of the aircraft 2. The flange 150 includes a pair of mounting apertures 152 (for clarity only one mounting aperture 152 is labelled on each flange) to facilitate the attachment of the flange 150 to the control surface 10 or intermediate element.

Integral with each flange 150 is an axially extending cylindrical casing element 154. The casing element 154 of first output annulus 120A is so configured that it at least partially overlies the support portions 142, 141A and bearings 144, 143A of the casing 128, and earth annulus 115A respectively. The bearings 144, 143A allow the first output annulus 120A to rotate around axis C relative to the first and second earth annuli 114, 115A.

The casing element 154 of second output annulus 120B is so configured that it at least partially overlies the support portions 141B of the second earth annulus 115A, 141A of the third earth annulus 115B, and bearings 143B of the second earth annulus 115A and 143A of the third earth annulus 115B respectively. The bearings 143B, 143A allow the second output annulus 120B to rotate around axis C relative to the second and third earth annuli 115A, 115B.

The casing element 154 of third output annulus 120C is so configured that it at least partially overlies the support portions 141B of the third earth annulus 115B, 146 and bearings 143B of the third earth annulus 115B and 148 of the casing 138 respectively. The bearings 143 of the third earth annulus 115B, 148 allow the third output annulus 120C to rotate around axis C relative to the third and fourth earth annuli 115B, 116.

Each casing element 154 includes a radially inwardly facing circular spline 192. each circular spline 192 has a number y of spline teeth. Each circular spline 192 extends in an axial direction.

Within the void defined by the casings 128, 138, the second and third earth annuli 115A, 115B, and the first, second and third output annuli 120A, 120B, 120C are first, second, and third wave generators 56A, 56B, 56C which are all mounted on the input shaft 118 via bearings 58, 60. The bearings 58, 60 allow the wave generators 56A, 56B, 56C to rotate around axis C independent of or at different rotational speeds to the rotation of the input shaft 118. Each wave generator 56A, 56B, 56C has the same features as the wave generator 56 described above in connection with FIGS. 2 to 5.

Also located within the void defined by the casings 128, 138, the second and third earth annuli 115A, 115B, and the first, second and third output annuli 120A, 120B, 120C is an epicyclic gear train 62. The epicyclic gear train 62 has the same features as the epicyclic gear train 62 described above in connection with FIGS. 2 to 5.

The output arm 64 of the epicyclic gear train 62 is configured to engage with and drive the wave generator 56A. Rotary motion is transmitted from wave generator 56A to wave generator 56B and 56C so that each wave generator rotates around the axis C and is caused to rotate by the epicyclic gear train 62.

Three pairs of flex splines 166A and 168A, 166B and 168B, and 166C and 168C are mounted within the void defined the casings 128, 138, the second and third earth annuli 115A, 115B, and the first, second and third output annuli 120A, 120B, 120C.

The flex spline 166A is so located that the earthing splines 78 of flex spline 166A are engaged with the earth splines 188 of casing 128. This earths or prevents the flex spline 166A from rotating around the axes C or D. When the flex spline 166A is earthed, the splines 86 of the spline zone 84 are positioned adjacent to but not engaged with the circular spline 192 of the first output annulus 120A other than in the positions 94, 96 where the first wave generator 56A deforms the flex spline 166A and pushes the splines 86 in positions 94, 96 into engagement with the splines of circular spline 192 of the first output annulus 120A at positions corresponding to positions 94, 95.

In a similar fashion, the flex spline 168A is so located that the earthing splines 78 of flex spline 168A are engaged with the earth splines 189A of the second earth annulus 115A. This earths or prevents the flex spline 168A from rotating around the axes C or D. When the flex spline 168A is earthed, the splines 86 of the spline zone 84 are positioned adjacent to but not engaged with the circular spline 192 of the first output annulus 120A other than in the positions 94, 96 where the first wave generator 56A deforms the flex spline 66 and pushes the splines 86 in positions 94, 96 into engagement with the splines of circular spline 192 of the first output annulus 120A at positions corresponding to positions 94, 95.

The flex splines 166A, 168A are so orientated that the mouths 82 of the flex splines 166A, 168A are facing each and are so distanced from each other that the splines 86 of each of the flex splines 166A, 168A engage with the circular spline 192 of the first output annulus 120A.

The flex spline 166B is so located that the earthing splines 78 of flex spline 166B are engaged with the earth splines 189B of the second earth annulus 115A. This earths or prevents the flex spline 166B from rotating around the axes C or D. When the flex spline 166B is earthed, the splines 86 of the spline zone 84 are positioned adjacent to but not engaged with the circular spline 192 of the second output annulus 120B other than in the positions 94, 96 where second first wave generator 56B deforms the flex spline 166B and pushes the splines 86 in positions 94, 96 into engagement with the splines of circular spline 192 of the second output annulus 120B at positions corresponding to positions 94, 95.

In a similar fashion, the flex spline 168B is so located that the earthing splines 78 of flex spline 168B are engaged with the earth splines 189B of the third earth annulus 115B. This earths or prevents the flex spline 168B from rotating around the axes C or D. When the flex spline 168B is earthed, the splines 86 of the spline zone 84 are positioned adjacent to but not engaged with the circular spline 192 of the second output annulus 120B other than in the positions 94, 96 where the second wave generator 56B deforms the flex spline 66 and pushes the splines 86 in positions 94, 96 into engagement with the splines of circular spline 192 of the second output annulus 120B at positions corresponding to positions 94, 95.

The flex splines 166B, 168B are so orientated that the mouths 82 of the flex splines 166B, 168B are facing each and are so distanced from each other that the splines 86 of each of the flex splines 166B, 168B engage with the circular spline 192 of the second output annulus 120B.

The flex spline 166C is so located that the earthing splines 78 of flex spline 166C are engaged with the earth splines 189B of the third earth annulus 115B. This earths or prevents the flex spline 166C from rotating around the axes C or D. When the flex spline 166C is earthed, the splines 86 of the spline zone 84 are positioned adjacent to but not engaged with the circular spline 192 of the third output annulus 120C other than in the positions 94, 96 where second first wave generator 56C deforms the flex spline 166C and pushes the splines 86 in positions 94, 96 into engagement with the splines of circular spline 192 of the third output annulus 120C at positions corresponding to positions 94, 95.

In a similar fashion, the flex spline 168C is so located that the earthing splines 78 of flex spline 168C are engaged with the earth splines 190 of the fourth earth annulus 116. This earths or prevents the flex spline 168C from rotating around the axes C or D. When the flex spline 168C is earthed, the splines 86 of the spline zone 84 are positioned adjacent to but not engaged with the circular spline 192 of the third output annulus 120C other than in the positions 94, 96 where the second wave generator 56B deforms the flex spline 66 and pushes the splines 86 in positions 94, 96 into engagement with the splines of circular spline 192 of the third output annulus 120C at positions corresponding to positions 94, 95.

The flex splines 166C, 168C are so orientated that the mouths 82 of the flex splines 166C, 168C are facing each and are so distanced from each other that the splines 86 of each of the flex splines 166C, 168C engage with the circular spline 192 of the third output annulus 120C.

The functioning of the actuator 112 and the interaction of the three pairs of flex splines 166A and 168A, 166B and 168B, and 166C and 168C with the first, second and third wave generators 56A, 56B, 56C and circular splines 192 of the first, second and third output annulus 120A are as described in connection with FIGS. 2 to 5 above.

The above description is meant to be exemplary only, and one skilled in the art will recognize that changes may be made to the embodiments described without departing from the scope of the disclosure. Still other modifications which fall within the scope of the present disclosure will be apparent to those skilled in the art, in light of a review of this disclosure.

Various aspects of the apparatus disclosed in the various embodiments may be used alone, in combination, or in a variety of arrangements not specifically discussed in the embodiments described above. This disclosure is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. An actuator, in which the actuator comprises an input shaft, a wave generator, a pair of flex splines, a pair of earth annuli, and an output annulus, in which
   each of the pair of flex splines are earthed to an earth annulus,
   the output annulus comprises a circular spline,
   the wave generator is configured to be activated by rotation of the input shaft, and
   the wave generator is configured to elastically deform both of the pair of flex splines when the input shaft activates the wave generator;
   wherein each of the pair of the flex splines is cup shaped including a radially extending cup base and a side wall extending from the cup base, the input shaft and each of the flex splines are coaxial, and the flex splines face in opposite directions.

2. An actuator according to claim 1, wherein the output annulus comprises one circular spline, and both of the pair of flex splines engage with the circular spline.

3. An actuator according to claim 1, wherein the wave generator comprises a pair of wave generator elements, each wave generator element is configured to be activated by rotation of the input shaft such that one of the wave generator elements elastically deforms one of the pair of flex splines, and the other of the wave generator elements deforms the other of the pair of flex splines.

4. An actuator according to claim 1, wherein the actuator comprises pre-stage gearing, the pre-stage gearing is configured to be driven by rotation of the input shaft, and the pre-stage gearing drives the wave generator.

5. An actuator according to claim 1, wherein the actuator comprises more than one pair of flex splines, and one or more output annuli.

6. An actuator according to claim 1, wherein the actuator comprises a first non-zero number of pairs of flex splines, a second non-zero number of output annuli, and the first non-zero number equals the second non-zero number.

7. An actuator according to claim 6, wherein the actuator comprises a third non-zero number of earth annuli, and the third non-zero number equals the second non-zero number plus one.

8. An actuator according to claim 1, wherein at least one flex spline comprises a set of earthing splines, at least one earth annulus comprises at least one set of earth splines configured to mesh with the set of earthing splines on a flex spline, and at least one flex spline is earthed to an earth annulus via the meshing of the earthing and earth splines.

9. A flex spline suitable for use in an actuator according to claim 1, wherein:

the flex spline comprises a central axis D, an earth portion and a flex portion;

the earth and flex portions are integral with each other and intersect at a corner portion;

the earth portion extends in an at least partially radially outward direction from a first edge to the corner portion; and the flex portion extends in an at least partially axial direction from the corner portion to a second edge; and the first edge of the earth portion has the form of a plurality of earthing splines.

10. A flex spline according to claim 9, wherein when the flex spline is in an undeformed configuration the earth and flex portions extend in substantially linear directions; and the angle between the direction in which the earth portion extends and the direction in which the flex portion extends is one of between 90 and 120 degrees.

11. A flex spline according to claim 9, wherein at least a portion of a radially outer face of the flex portion has the form of a plurality of axially extending splines.

12. An aircraft control surface actuation system comprising:
a controller; and
at least one actuator as recited in claim 1.

13. An aircraft control surface system comprising:
a controller;
at least one actuator as recited in claim 1; and
a control surface controlled by the at least one actuator.

14. An aircraft comprising:
at least one aircraft control surface system according to claim 13.

* * * * *